Aug. 30, 1966   D. A. FOGG ETAL   3,269,522
HEAVY DUTY ACCUMULATOR
Filed Oct. 23, 1964   6 Sheets-Sheet 1
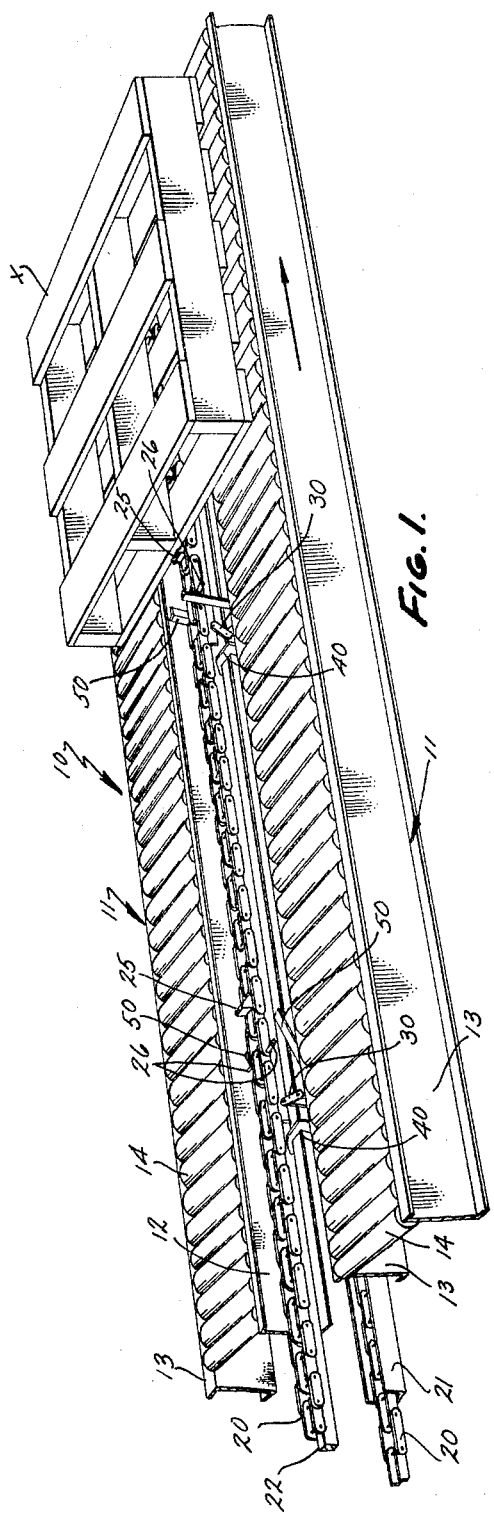
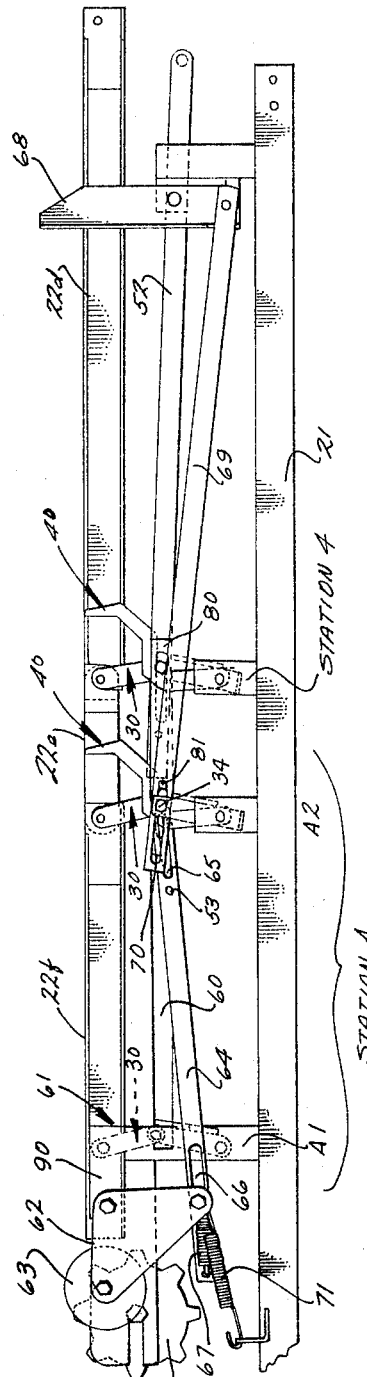
INVENTORS
DANIEL A. FOGG
NORMAN C. POEL
BY
*Price & Heneveld*
ATTORNEYS

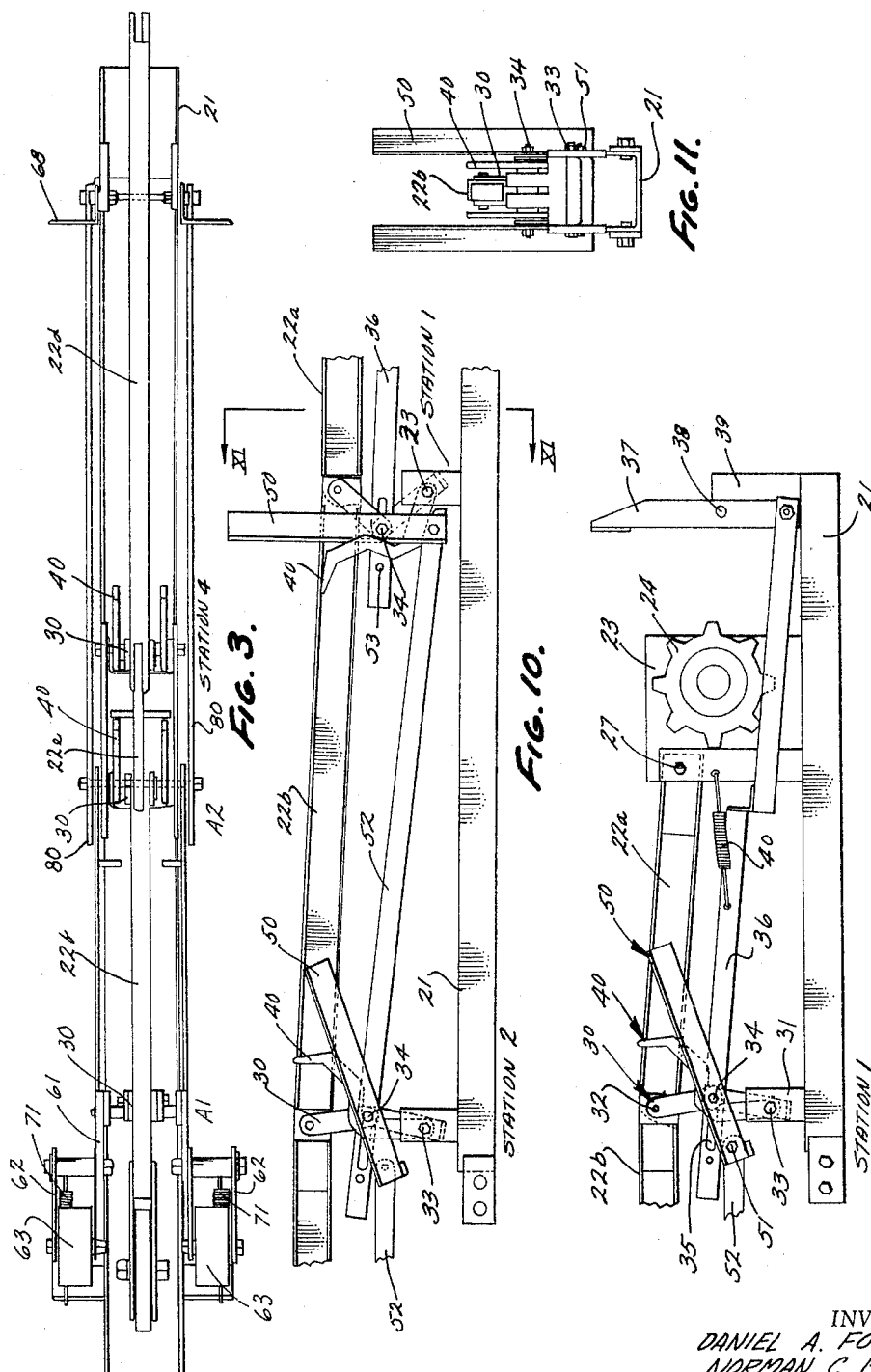

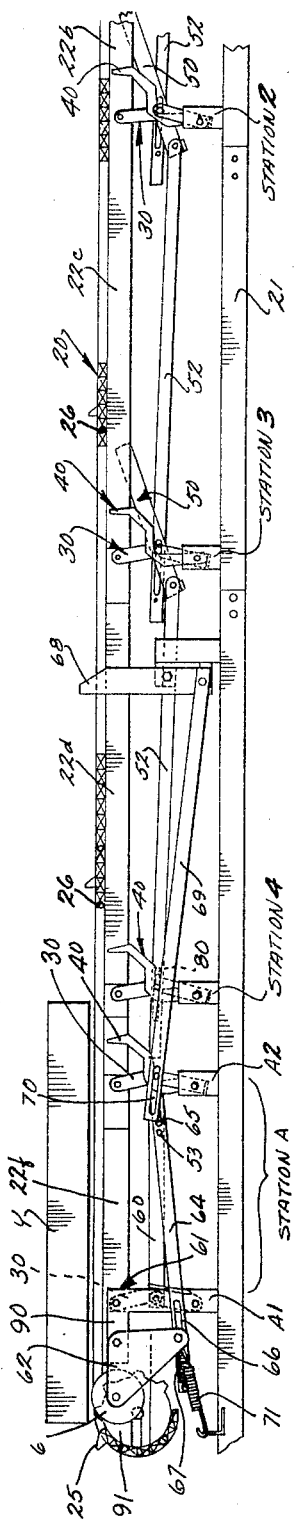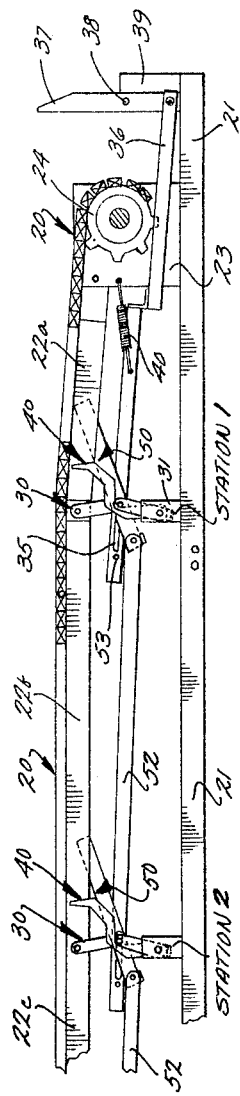

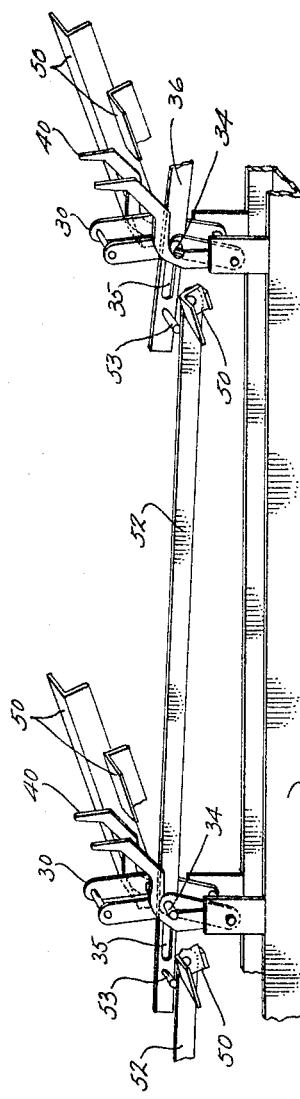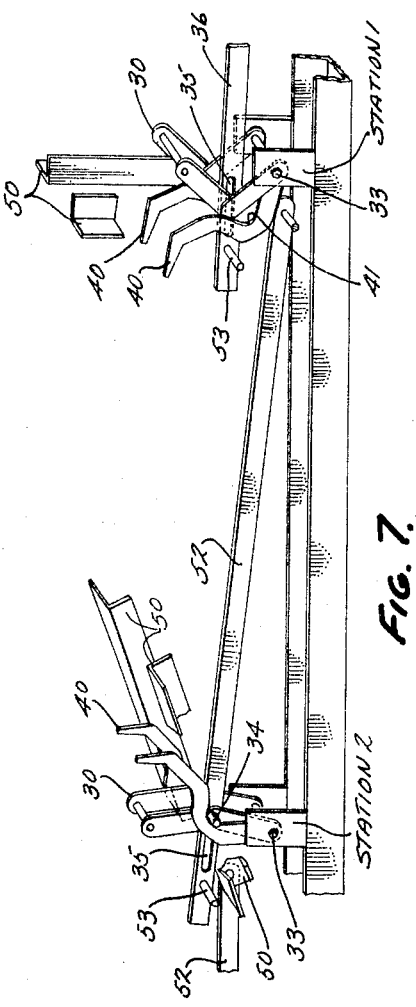

INVENTOR.
DANIEL A. FOGG
NORMAN C. POEL
BY

ATTORNEYS

United States Patent Office 3,269,522
Patented August 30, 1966

3,269,522
HEAVY DUTY ACCUMULATOR
Daniel A. Fogg, White Cloud, and Norman C. Poel, Grand Rapids, Mich., assignors to The Rapids-Standard Company, Inc., Grand Rapids, Mich., a corporation of Michigan
Filed Oct. 23, 1964, Ser. No. 405,916
8 Claims. (Cl. 198—160)

This invention relates to accumulator-type conveyors, and particularly to such a conveyor designed specifically for handling extremely heavy loads, such as pallets having a load of one or more tons per pallet.

United States Patents 3,062,359 and 3,116,823 disclose accumulator-type conveyors related to this invention. However, these are conveyors designed for loads of such a type that they can be propelled by frictional engagement between the propelling member and the article being conveyed. However, when the loads to be moved along the conveyor become extremely heavy, such as pallets loaded to 2,000 pounds or more, frictional contact is neither sufficient nor practical as a means of transferring the propelling force. To move such objects, it is necessary that there be positive or interference-type engagement between the propelling member and the object. This creates several problems.

First among these problems is the fact that the forces required to operate the conveyor are such that the propelling member must be a chain of substantial tensile strength. This means that the chain, itself, is heavy. Consequently, the forces required to raise and lower the chain are proportionally increased.

A second problem that arises is the fact that to obtain positive engagement between the chain and the object or pallet, the chain is equipped with dogs. To effect engagement and disengagement, the amount of vertical travel required is substantially greater than in situations involving frictional contact. As a result, the supporting structure for the chain or propelling member has to travel a substantially greater distance between its raised and lowered positions. Under such circumstances, the use of biasing springs and similar structures is not practical because the springs generating sufficient energy to do the job are too heavy to be article loaded. The substitution of individual power units for the springs makes the unit too expensive. It further greatly increases maintenance requirements and expense because each of the units represents a potential service failure.

Despite these problems, the conveyor must be so designed that it is automatic in operation. That is, it must be capable of sensing the accumulation of the pallets and automatically release them from the chain. At the same time, it must be capable of automatic reinitiation of movement of the pallets, one by one, when the impediment to forward travel is removed. Since the engagement between the pallet and the propelling member is positive, provision must be made to assure positioning of the dogs in relation to the pallets on the conveyor when the dogs are raised into active position. Failure to do this will result in the dogs improperly engaging the pallets, resulting in malfunction and perhaps, serious damage. The release also must be positive. Failure to release when the pallet approaches the end of the conveyor or an accumulation of pallets ahead of it would result in substantial damage not only to the pallets and their loads, but also to the equipment itself.

This invention provides a heavy-duty conveyor equipped with means of accomplishing accumulation, while at the same time, meeting all of the various requirements necessary to make a satisfactory operating structure.

These and other objects and purposes of this invention will be understood by those acquainted with the design and construction of conveyors upon reading the following specification and the accompanying drawings.

In the drawings:

FIG. 1 is a fragmentary, oblique view of a conveyor embodying this invention;

FIG. 2 is a fragmentary, side elevation view taken along the medial lane of the conveyor, showing the article receiving end of the conveyor;

FIG. 3 is a plan view of that portion of the conveyor illustrated in FIG. 2;

FIGS. 4 and 4A are side elevation views taken along the medial lane with the two views together illustrating the entire length of the conveyor; FIG. 4 being the receiving end and 4A the discharge end;

FIG. 5 is an enlarged, fragmentary, side elevation view of the conveyor taken along the medial lane illustrating the discharge end of the conveyor, the conveyor being shown empty;

FIG. 6 is an enlarged fragmentary, partially broken, oblique view taken along the medial lane showing stations 1 and 2, with both stations erected;

FIG. 7 is a view similar to FIG. 6 showing station 1 lowered and station 2 erected but sensitized to lower;

FIG. 10 is an enlarged, fragmentary, side elevation view taken along the medial lane showing stations 1 and 2 in the same condition as illustrated in FIG. 7;

FIG. 11 is a sectional elevation view taken along the plane XI—XI of FIG. 10;

Figure 13:
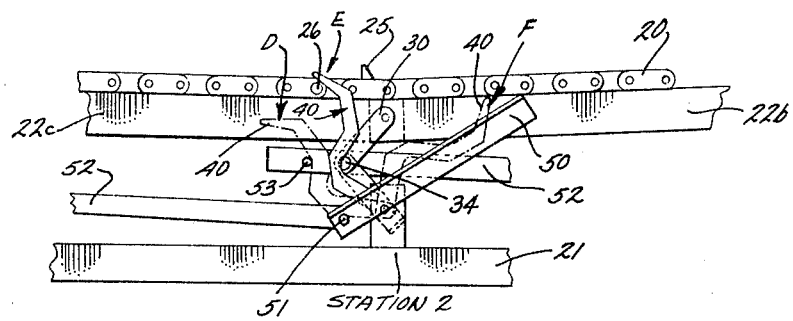
Figure 12:
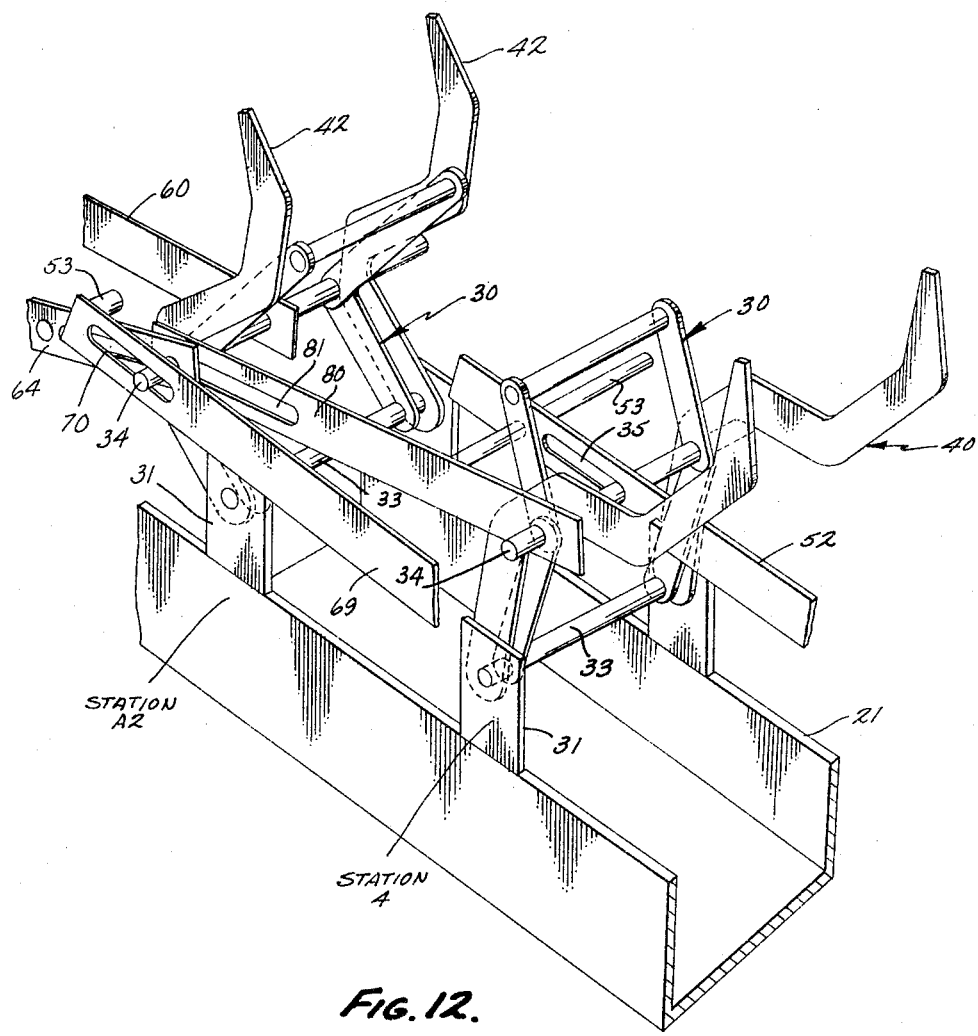

FIG. 12 is a fragmentary, oblique, partially broken view of station 4 and support member A2 of station A, showing the receiving station A sensitized and station 4 raised; and FIG. 13 is a fragmentary, side elevation view of station 2 illustrating the three positions assumed by the arming hook.

The conveyor consists of a supporting or conveying track having a medial lane through which travels a continuously moving powered propelling member having dogs at spaced intervals to push the articles along the conveyor. The chain is supported by a segmented rail or track. Each segment of this track is supported at each end by a toggle which may be raised or lowered sufficiently to engage or disengage the dog from the article. All of the toggles are interconnected by links. At the discharge end of the conveyor is an initiator which, when activated by an article pressing against it, breaks the adjacent, upstream toggle, thus, dropping the chain and releasing from the propelling member the pallet in contact with the initiator. As the toggle at the first station is lowered or broken, this raises a sentry arm at this station. The next following pallet will strike this sentry arm, depressing it, resulting in the toggle at the next station upstream being broken and thus, disengaging the propelling member from the second pallet. This procedure repeats, station by station, upstream of the conveyor until all stations in the conveyor are filled with pallets. When the toggle of the station downstream of the receiving station is broken, it will deactivate the receiving station so that the next pallet to enter the receiving station will not be engaged. It is to be noted that in each case the pallet is slightly downstream of the toggle or station which controls its movement.

When the first pallet is removed, the initiator is released. Its release automatically sensitizes the adjacent upstream station by swinging an arming hook at that station into erected position. In this position, it is in the path of pins mounted on the propelling member or chain. The next pin to pass through this station will carry the arming hook over into fired position, and in so doing, erect the toggle. This raises the chain and also sensitizes the next station upstream. The next pin to pass this next or second station will erect this toggle and the dog adjacent that pin. That dog will engage behind the second pallet (which is next downstream of the station) and push it to the end of the conveyor. The erection of the toggle behind the second pallet will automatically sensitize or erect the arming hook at the next or third station upstream. Thus, when the next pin comes along, it will erect the toggle at this station, initiating movement of the third pallet. This process continues, station by station, upstream until all of the pallets have moved forward at least one station along the conveyor. So long as the pallets continue to be removed from the end or discharge station as rapidly as they enter it, forward movement of the pallets will continue. However, when the leading pallet is allowed to depress and hold the initiator, the accumulating sequence mentioned above will repeat, station by station, up the conveyor, until all the pallets have accumulated again. When the next to the last pallet to enter the conveyor has reinitiated movement, and has cleared the monitor arm, because the toggle at station 4 has by then been erected, the receiving station will automatically be sensitized and the next pin will engage the arming hooks to erect the receiving station toggles and thus, the next dog will move the last pallet out along the conveyor. Once this last pallet has engaged the monitor arm, the receiving station will be returned to normal condition ready to receive additional pallets.

In the following description, the term "upstream" means toward the receiving end of the conveyor and the term "downstream" means toward the discharge end of the conveyor.

That portion of the conveyor adjacent its discharge end is illustrated in FIG. 1. The pallet X is illustrated after its movement has been arrested by the initiator arm. The basic conveyor 10 consists of a pair of tracks 11 spread apart to form a medial lane 12. Each of the tracks 11 has a pair of side rails 13 between which are mounted freely rotatable, article supporting rollers 14. The rollers 14 form a conveying bed or surface along which heavy articles such as the pallet X can be moved in the direction of the arrow in FIG. 1. Any other conveying bed may be used.

Mounted in the medial lane 12 is a propelling member or chain 20. The lower or return run of the chain travels in a U-shaped base frame 21. The upper or working run of the propelling member rides on a sectionalized rail 22. This rail 22 is divided into a plurality of sections 22a through 22f (FIGS. 4 and 4A), pivotally joined together at their ends in tandem. Rail section 22e is a short transition section between stations 4 and A and is necessitated by their close proximity.

At the discharge end of the conveyor, a journal block 23 is mounted to the base frame 21 (FIG. 5). It mounts the drive sprocket 24 for the propelling member 20. It will be understood that the drive sprocket 24 is driven by any suitable means such as a prime mover and gear reducer. These are not illustrated since they are conventional. Other than that they exist to continuously power the propelling member, they do not form a part of this invention.

The chain 20 has dogs 25 secured to it and projecting above its surface (FIGS. 1 and 13). These are mounted on the chain at equally spaced intervals of greater length than the length of the pallets. Associated with each dog is a pair of pins 26, one projecting horizontally from each side of the chain. The pins of each pair are aligned crosswise of the chain. When the conveyor's ability to accumulate is to be used to its maximum potential, that is, the closest possible pack, the pins associated with a particular dog are mounted to the chain at a precise distance behind the dog. As greater spacing is allowed between accumulated pallets, this spacing relationship becomes less critical.

One end of the rail section 22a is pivotally mounted at 27 to the journal block 23. This end of the rail section 22a is fixed against vertical movement and is at a height such that the propelling member 20 at this point is lower to a height at which the dogs 25 on the propelling member will pass under a pallet as will be explained subsequently.

The other end of the rail section 22a is pivotally joined to the adjacent end of the rail section 22b, the pivotal point of attachment being common to the attachment of both of these rails to a support member or toggle 30 at station 1 (FIGS. 4A and 5). The lower end of the toggle 30 is pivotally secured to a pair of stationary ears 31, mounted on the base frame 21. The pivotal attachment between the toggle and the rail sections is made by the pivot pin 32. The anchor pin 33 makes the pivotal attachment between the toggle and the ears 31. As is best seen in FIG. 7, the toggle 30 consists of an upper portion and a lower portion each of which consists of a pair of links, one on each side of the rail 22.

The upper and lower portions of the toggle are joined together by a hinge pin 34. The hinge pin of station 1 (FIG. 4A) passes through an elongated slot 35 in an initiator link 36. The other end of the initiator link 36 is pivotally secured to the lower end of the initiator arm 37. The initiator arm 37, intermediate its ends, is pivotally mounted at 38 to a fixed base 39. The upper end of the initiator arm 37 projects above the conveying surface of the tracks 11, whereby a pallet reaching the end of the conveyor will swing it to the right (as it is illustrated in FIGS. 4A and 5).

The initiator arm is biased into erected position by the spring 40 which urges the initiator link 36 to the right or downstream as illustrated in FIGS. 4A and 5. In this position, the hinge pin 34 is at the right-hand or downstream end of the slotted opening 35 when the toggle 30 is erected.

Also mounted at the station 1 is an erector element or arming hook 40. The arming hooks 40 are best seen in FIGS. 6–9 and 13. Each arming hook consists of a pair of hook elements sufficiently spaced to permit the rail 22 to pass between them. The hook elements are generally S-shaped forming a downstream socket portion 41 and a finger portion 42 at their upper or free ends (FIG. 7). The lower ends of the hook elements are pivotally mounted by the anchor pin 33, and thus, are concentric in their swinging movement with the lower portion of the toggle 30. The hinge pin 34 projects beyond the toggle and seats in the sockets 41 of the hook elements as they swing.

Figure 8:
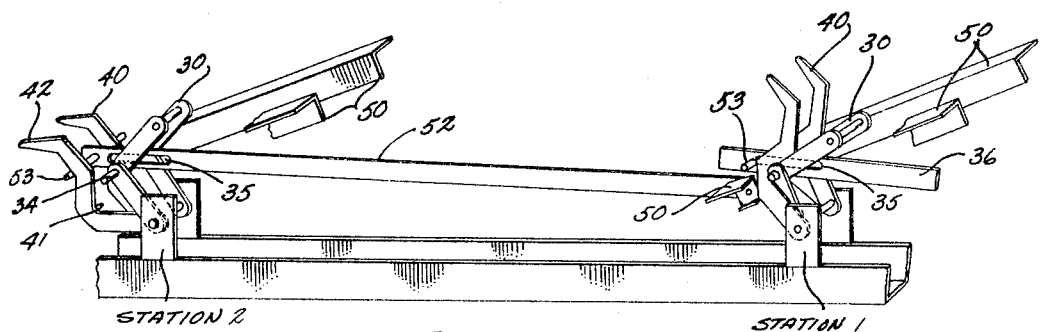
FIG. 8 is a view similar to FIG. 6 showing both stations lowered and station 1 cocked ready to erect.
Figure 9:
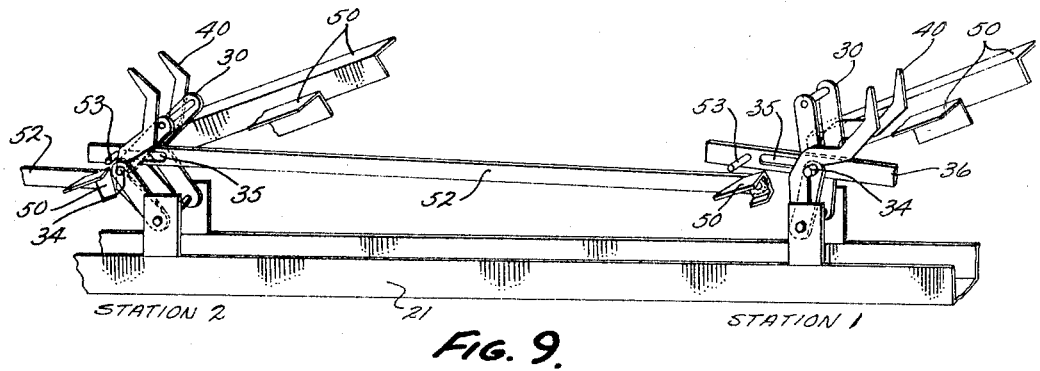
FIG. 9 is a view similar to FIG. 6 showing station 1 erected and station 2 cocked ready to erect.

The arming hook 40 has three positions (FIG. 13). The first position is a fully retracted position in which it is pivoted upstream (FIG. 8-Sta. 2) and the tops of the finger portions 42 are below the pins 26 on the propelling member 20 (FIG. 1 see also Position "D" FIG. 13). The second position is an erected position in which the arming hook is generally vertical with the fingers 42 projecting into the path of the pins 26 on the propelling member 20 (FIG. 8-Sta. 1—see also Position "E" FIG. 13). In this position, it can be said to be sensitized. In this position, the hinge pin 34 of the broken or lowered toggle is nested in the socket 41. The third position is the fired position. In this position, the arming hook is pivoted to the limit of its downstream travel. In this position, the fingers 42 are below the pins 26 on the propelling member (FIG. 9-Sta. 1—see also Position "F" FIG. 13). The downstream swing of the arming hook is limited by the hinge pin 34 of the toggle 30.

Associated with each toggle 30, except at A1, A2 and Sta. 4, is an article sensing means or sentry arm 50. Each sentry arm consists of a pair of arm elements, one on each side of the arming hook and each pivoted intermediate its ends of the hinge pin 34. The lower end of each of the sentry arms 50 is pivotally connected at 51 (FIG. 13) to a connecting link 52. The connecting link 52 extends upstream to the next station. Except for the fact that it is connected from one sentry arm to the next upstream toggle assembly, and the fact that it has no biasing spring and no offset, it is similar to the initiator link 36. Like the initiator link, each connecting link has a slotted opening 35 and a cocking pin 53 (to be subsequently described).

The initiator link between the slotted opening 35 and its upstream end has a cocking pin 53. When the arming hook 40 of station 1 is in its upstream or retracted position, it rests on the cocking pin 53. The cocking pin 53 is the means by which the arming hooks 40 are pivoted from retracted to erected position when either the initiator link 36 or a connecting link 52 shifts downstream.

This identical structure, consisting of a toggle 30, arming hook 40, sentry arm 50 and connecting link 52, is repeated at stations 2 and 3 (FIGS. 4 and 4A). Station 4 is similar to stations 1, 2 and 3 except that it has no sentry arm (FIG. 4). The purpose of this will be described subsequently. It will be recognized that the number of stations will depend upon the overall length of the conveyor. However, for purposes of illustration, only four stations are shown, but this is not to be considered a limitation upon either the size, length or function of this conveyor. A conveyor of greater length will merely add more stations identical to stations 2 and 3.

Station A is at the receiving end of the conveyor and constitutes the receiving station for the conveyor (FIG. 4). This station is the length of a pallet or longer and has a pair of toggles 30, one each at support members A1 and A2 (FIGS. 2 and 4). The toggles are joined together for simultaneous and identical operation by the tie link 60. The support member at A2 has an arming hook 40 similar to the arming hooks at stations 1 through 4. Like station 4, it is not equipped with a sentry arm. Support member A1 is equipped only with a toggle 30, having no sentry arm and no arming hook.

A stationary bracket 61 is provided at support member A1. The stationary bracket 61 has a pair of uprights from which a pair of wings 90 project upstream of the conveyor (FIGS. 2 and 4). The hanger 62 is pivoted to the ends of these wings. The rail section 22f is nested between the uprights of stationary bracket 61. The terminal sprocket 91 for the chain 20 is mounted on the end of the rail section 22f. The pivotal mounting of the hanger permits the wheels 63 to be depressed whenever an object such as the pallet Y (FIG. 4) is positioned over them on entering the conveyor. This depression of the starter wheels 63 pivots the bracket 62 which in turn pushes the starter link 64 downstream.

The toggles 30 at support members A1 and A2 are normally broken or in down position. It will be noted that the starter link has a slotted opening 65 at one end, and a slotted opening 66 at the other end. The slotted opening 65 receives the hinge pin 34 of the toggle at the support member A2. The slot 66 provides a lost motion or override connection with the bracket 62.

When the toggles at A1 and A2 are broken, the hinge pin 34 of the toggle 30 at A2 is intermediate the ends of the slot 65. The presence of a pallet Y on the starter wheels 63 depresses these wheels, shifting the bracket 62 to the right, tensioning the spring 67 which connects the bracket to the starter link 64. Under normal conditions, this shifts the starter link 64 downstream, bringing the arming pin 53 on the link into engagement with the arming hook 40 at A2, swinging it to erected position. This sensitizes station A for erection.

However, if that portion of the conveyor above the rail section 22d (FIG. 4) is occupied by a pallet, it will overlay the sensor or monitor arm 68, swinging it downstream or to the right as illustrated in FIGS. 2 and 4. This shifts the monitor link 69 upstream. The upstream end of the monitor link has a slotted opening 70 permitting the hinge pin 34 of the toggle of support member A2 to pass through it. As this link is shifted upstream, it breaks the toggle 30 at A1 and A2. It will then remain depressed until the link 64 shifts downstream to sensitize arming hook 40 at A2.

The ends of the hinge pins 34 of the toggle 30 at station 4 and the toggle at A2 are interconnected by a locking link 80 (FIGS. 2 and 12). The locking link is pivotally connected at station 4 and has a slotted opening 81 at A2. When both the station 4 and A2 toggles are erected, the hinge pin 34 of A2 is intermediate the ends of slot 81. When the toggle at station 4 is broken, the locking link 80 is shifted upstream and its end is positioned in the path of downstream movement of cocking pin 53 on starter link 64.

So long as the locking pin 80 remains in this position, downstream movement of starter link 64 is prevented. This is possible because the spring 67 makes a resilient lost motion or override connection between the bracket 62 and the starter link 64, the slot 66 permitting relative movement between the two without positive interference. However, the spring 67 places a bias on the starter link 64 which will cause the starter link 64 to shift downstream as soon as the toggle of station 4 is erected. The spring 67 upon erection of station 4 pivots the arming hook 40 at A2 to cocked position. When the toggles of station A are erected, the monitor arm 68 will be erected. The starter wheels 63 are biased separately into raised position by the spring 71.

When the rail section 22f is lowered, it lowers the sprocket 91. When the sprocket 91 is lowered, it permits a pallet to rest on the starter wheels 63, holding them in depressed position, yet the pallet will be above the dogs 25 on the chain.

Having described the basic structure of the individual support members and thus, of the stations involved in the conveyor, in order to complete the description of the conveyor, it is considered best to describe it in terms of its operation. This will be done in sequential order.

Initially, the conveyor has no articles on it and is assumed to be fully operative. As such, all toggles 30 except the support members A1 and A2 of station A are erected or made. All sentry arms 50 and the monitor arm 68 are retracted. The initiator arm 37 is erected. The toggles 30 of support members A1 and A2 are broken or down. The starter wheels 63 are erected and project into the path of a pallet entering the conveyor. All stations are non-sensitized and all arming hooks are in fired or downstream position, except station A2 where the arming hook is in the retracted position. Thus, the chain 20 and the chain supporting rail sections 22a–22e are all in their raised or active position. The rail section 22f at station A is down or inactive. The chain is in constant operation and the chain pins are moving along above and out of contact with the arming hooks.

The first pallet Y (FIG. 4) to enter the conveyor passes over the starter wheels 63 depressing them. This shifts the starter link 64 to the right causing the cocking pin 53 of support member A2 to shift arming hook 40 to armed or cocked position. The rail section 22f remains down or retracted. Nothing will happen except that, unillustrated equipment, not forming a part of this conveyor, will move the pallet Y fully out on the station A, but maintaining the rear portion of it on wheels 63. When the next chain pin 26 arrives at the cocked arming hook at A2, it will engage the finger portions 42 of the arming hook, pivoting the arming hook downstream into fired position. As the arming hook pivots, it will carry the hinge pin 34 of the toggle with it. This will erect the toggles at support members A1 and A2, raising the rail section 22f. The dog 25 associated with the pin 26 which fired the arming hook will clear the front end of the pallet. The next dog will engage the back of the pallet and start to push it along the conveyor. The erection of the toggles at A1 and A2 will erect the monitor arm 68.

There are as many dogs 25 as chain pins 26 on the chain 20 with one chain pin 26 and one dog 25 constituting an actuator couple.

The spacing between the pin 26 and the dog 25 forming an actuator couple must be keyed to the gap between the pallets. The spacing is controlled by the fact that the chain as it is raised must have the dog 25 related to the pin effecting erection behind the pallet, except at the receiving end. Unless this relationship exists, the dog might be raised beneath the pallet which would improperly space the pallets resulting in collision. Also, serious damage would result both to the pallet and the equipment. Further, as will later be explained, the section of conveyor overlying the rail section 22d must be empty or the pallet thereon already in movement and clear of the monitor arm 68.

The pallet Y will now proceed down the entire length of the conveyor. As it does so, it will depress the monitor arm 68. This will break the toggles at stations A1 and A2, lowering the rail section 22f inactivating station A, making it ready to receive another pallet. The monitor arm 68 will remain depressed until the toggles at station A are once again erected.

During the rest of its trip down the length of the conveyor, the presence of the pallet will do nothing until it contacts and depresses the initiator arm 37. The typical condition of the stations as the pallet progresses is illustrated in FIG. 6. This result occurs because, in the absence of accumulated pallets on the conveyor, the system is so designed that it functions purely as a means of transportation.

When the pallet depresses the initiator arm 37, the initiator link 36 will shift upstream, breaking the toggle 30 at station 1. This lowers the upstream end of rail section 22a and the downstream end of the rail section 22b. This disengages the dog from the pallet depressing the initiator arm 37, allowing it to remain stationary on the conveyor, the dog passing below the pallet. The upstream pivotal movement of the hinge pin 34 of the toggle at station 1 erects or sensitizes the sentry arm 50 at this station. This result occurs because the lower end of the sentry arm is held stationary by the tie link 52. The other end of the tie link 52 is held against movement by the fact that the hinge pin of the erected toggle at station 2 is at the downstream end of the slot 35. The force required to break this toggle is substantially greater than that necessary to erect the sentry arm. It will be noted that all the toggles 30, when erected, are over center. Thus, a force of significant magnitude must be applied to break them. The breaking of the toggle 30 at station 1 also pivots the arming hook at this station from fired to retracted position. This movement occurs because the hinge pin 34 is nested in the socket of the arming hook. The arming hook in retracted position rests on the cocking pins 53. The condition at station 1 after these parts have so been repositioned is illustrated in FIG. 7.

The erection of the sentry arm at station 1 sensitizes station 2 ready for lowering.

The next pallet will enter the conveyor in the same manner as described for the first pallet and will proceed along the conveyor until it contacts and depresses the sentry arm 50 at station 1. The depressing of the sentry arm 50 at station 1 will break the toggle at station 2, lowering the upstream end of the rail section 22b and the downstream end of the rail section 22c. The breaking of the toggle 30 at station 2 will cause disengagement between the second pallet and its pusher dog.

The breaking of the toggle 30 at station 2 will occur because the tie link 52 will be shifted upstream. Since the hinge pin of toggle 30 at station 2 was in contact with the downstream end of the slot 35, this movement of the link will force the hinge pin upstream breaking the toggle.

The breaking of the toggle 30 will have the same effect as at station 1. It will pivot station 2's arming hook 40 to retracted position, erect the sentry arm 50 and sensitize station 3 ready to be lowered.

The third pallet to enter the conveyor will repeat this operation, depressing the sentry arm at station 2, breaking the toggle at station 3. This will lower the upstream end of rail section 22c and the downstream end of rail section 22d. At the same time at station 3, the arming hook 40 will be pivoted to retracted position and the sentry arm 50 erected. Station 4 is now sensitized ready to be lowered.

The fourth pallet to enter the conveyor will first depress the monitor arm 68 and then depress the sentry arm 50 at station 3. This will break the toggle at station 4 and pivot station 4's arming hook to retracted position. At the same time, the upstream end of rail section 22d and the downstream end of section 22e will be lowered. Since station 4 has no sentry arm this result is omitted.

The fourth pallet will become stationary while positioned over the monitor arm 68 holding it in depressed position. The depression of the monitor arm 68 breaks the toggles at support members A1 and A2 of station A. This lowers rail section 22f. When the toggle at station 4 breaks it locks out or neutralizes the sensitizing effect of the starter wheels 63, by shifting the locking link 80 upstream into the path of the cocking pin 53 of starter link 64. This arrangement prevents the next pallet entering station A from being engaged by the chain when the conveyor ahead of it is fully loaded or slugged. Thus, when the last (fifth) pallet enters the conveyor, depressing the starter wheels, nothing will happen. The spring 67 provides an override connection permitting the starter wheels to be and remain depressed without shifting the starter link 64. However, the spring 67 will apply a continuing bias to the starter link 64 such that when the station 4 erects, shifting the locking link 80 downstream, the arming hook at support member A2 will be shifted immediately to cocked position.

It will be understood that the conveyor is now fully loaded and inactive. The chain continues to move, but is ineffective in providing any transportation. The conveyor can remain indefinitely in this condition because all pallets are disengaged from the chain 20. At this point, the conveyor is providing only accumulator storage.

To reactivate the conveyor, the first pallet is removed, releasing the initiator arm 37. The spring 40 immediately erects the initiator arm, shifting the initiator link 36 downstream. The cocking pin 53 on the upstream end of the initiator link 36 pivots the arming hook 40 at station 1 to cocked position (FIG. 8). In this position, its finger portion 42 is in the path of the next chain pin 26 to pass through station 1. As this chain pin 26 passes station 1, it will pivot the arming hook 40 to fired position, erecting the toggle 30 at this station (FIG. 9). The firing of the arming hook at station 1 simultaneously cocks the arming hook at station 2 (FIG. 9). This occurs because the arming pin 53 on the upstream end of the link 52 pulls the arming hook upright as the link shifts downstream with the erection of the toggle 30 at station 1.

The erection of the toggle at station 1 raises the upstream end of rail section 22a and the downstream end of rail section 22b. This raises that portion of the chain resting on these links. This prepares the end or discharge station of the conveyor to receive the second pallet.

The chain pin 26 of the next following actuator couple will engage and fire the arming hook at station 2. This will erect the toggle at station 2 and cock the arming hook at station 3. The pusher dog 25 of the actuator couple having the pin 26 which erected the toggle at station 2 will now engage the second pallet and push it to the end of the conveyor.

The pin 26 of the next following actuator couple will fire the arming hook at station 3 erecting the toggle at station 3 and cocking the arming hook at station 4. The pusher dog 25 of the actuator couple having the pin 26 which erected the toggle at station 3 will initiate movement of the third pallet. The pin 26 of the next following actuator couple will engage and fire the cocked arming hook at station 4. This will initiate movement of the fourth pallet as above. As soon as the fourth pallet moves beyond and releases the monitor arm 68, it will be free to erect. When the toggle at station 4 erects, it will shift the locking link 80, releasing the starter link 64 to cock the arming hook 40 at support member A2. The bias of the spring 67 forming the override connection between the starter link 64 and the depressed starter wheels 63 automatically effects this result.

The pin of the next actuator couple will fire the arming hook 40 at support member A2 erecting both toggles at A1 and A2 and erecting monitor arm 68. The dog of the next actuator couple will initiate movement of the fifth pallet (Pallet Y in FIG. 4). As it passes over the monitor arm 68, depressing it, the toggles at A1 and A2 will be broken.

Assuming the pallets are removed from the conveyor as rapidly as they arrive at the initiator arm 37, upon removal of all five pallets, the conveyor will have automatically reset itself in its initial condition with all stations erected except station A. All arming hooks will be in fired position, except at A2, all sentry arms and the monitor arm retracted. The initiator arm will be erected.

It will be understood from the above description that as many intermediate stations, similar to station 2, may be added to the conveyor as desired. This will not change its function, merely increasing its length and the number of pallets which can be simultaneously accumulated on it.

It will be seen that this conveyor is capable of transporting very heavy unit loads. It is capable of operating continuously as a simple conveyor automatically spacing the pallets as they are transported. At the same time, it will function as an accumulator with fully automatic pallet arresting and restarting capabilities. It automatically prevents collision between pallets and incorporates safety factors preventing misengagement between the propelling member and the pallets.

It will be understood that only a preferred embodiment of this invention has been illustrated and described. Modifications of this embodiment may be made without departing from the principle of the invention. Such modifications are to be considered as included in the claims unless the claims, by their language, expressly state otherwise.

We claim:

1. An article accumulator conveyor characterized by an article supporting track and a powered, continuously operating propelling member having article engaging dogs at spaced intervals at least equal to the article length plus the spacing to be maintained between articles when accumulated; a sectionalized propelling member support and a plurality of support means of variable height supporting each individual section, said support means in raised position holding the dogs of said propelling member in article engaging position and in lowered position holding said propelling member and dogs in position to pass beneath the articles without engagement; each of said support means constituting a station; a sentry arm at each of said support means mounted for pivotal movement between a raised and lowered position, an initiator means at the discharge end of said conveyor connected to the support means and sentry arm of the adjacent first station; a plurality of connecting links each operatively connecting the sentry arm of one station to the support means and sentry arm of the next adjacent station upstream of said conveyor; said initiator means upon being contacted by a first article shifting said support means at the first station to lowered position and shifting the sentry arm at said first station to raised article engaging position, said sentry arm at said first station upon being contacted and depressed by a second article shifting the support means at the second station to lowered position and the sentry arm at the second station to raised position; said shifting of said support means and said sentry arm being repeated at each station progressively upstream of the conveyor as more articles accumulate thereon.

2. An accumulator conveyor as described in claim 1 wherein an arming hook is pivotally mounted at each of said stations and shiftable between retracted, cocked and fired positions; each of said arming hooks being operatively connected to the support means at its station; the first of said arming hooks being at said first station; said connecting links also being operatively connected to the arming hook of the adjacent upstream station; said sensing means upon removal of the first article shifting said first arming hook to cocked position; a plurality of pins on said propelling member at spaced intervals identical to the spacing of said dogs and each being adjacent its associated dog; said arming hooks when cocked being in the path of the next approaching pin and upon contact by said pin being shifted to fired position and shifting the supporting means at its station to raised position shifting the arming hook at the next station to cocked position; said shifting of said arming hooks first to cocked and then to fired positions being repeated at each station progressively upstream of the conveyor as more articles accumulated thereon reinitiate forward movement.

3. An accumulator conveyor as described in claim 1 having a sensor at the receiving end thereof; a pair of said support means adjacent said sensor and linked together for simultaneous movement and constituting the last of said stations; one of said arming hooks connected to the one of said pair of support means remote from said sensor; a linkage having a bias generating lost motion connection connecting said sensor to said arming hook; a monitor element spaced downstream from said last station connected to said support means of said last station and holding them in down position and said arming hook in retracted position when said monitor element is depressed by an article superimposed thereover; said sensor upon contact by an article entering said conveyor shifting said arming hook of said pair of support means to cocked position when said monitor element is raised and through said bias generating lost motion connection biasing said arming hook to said position without shifting it when said monitor element is depressed; said bias generating lost motion connection cocking said arming hook when said monitor element is released by an article.

4. An article accumulator conveyor characterized by an article supporting track and a powered, continuously operating propelling member having article engaging dogs at spaced intervals at least equal to the article length plus the spacing to be maintained between articles when accumulated; a sectionalized propelling member support and a plurality of support means of variable height supporting each individual section thereof, said support means in raised position holding the dogs of said propelling member in article engaging position and in lowered position holding said propelling member and dogs in position to pass beneath the articles without engagement; each of said support means constituting a station; article sensing means at each of said stations mounted for engagement with articles passing thereover and shiftable between sensitized and inactive conditions; an initiator means at the discharge end of said conveyor connected to the support means and article sensing means at the first station adjacent thereto; a plurality of connecting elements each operatively connecting the article sensing means of one station to the support means and article sensing means of the next adjacent station upstream of said conveyor; said initiator means upon being actuated by a first article shifting said support means at said first station to lowered poistion and shifting said article sensing means to sensitized condition; said article sensing means when actuated by a second article shifting to inactive condition and shifting said support means at the second station to lowered position and the article sensing means associated therewith at said second station to sensitized condition; said shifting of said support means and said article sensing means being repeated at each station progressively upstream of the conveyor as more articles accumulate thereon.

5. An accumulator conveyor as described in claim 4 wherein an erector element is provided at each station; each of said erector elements being operatively connected to the support means of its station and to both the sensing means and support means of the next adjacent station downstream; each of said erector elements being shiftable between sensitized and retracted positions; engagement means at spaced intervals on said propelling member for engaging said erector elements when sensitized and shifting them to retracted position, and each erector element when so shifted, moving the supporting means at its station to raised position and shifting the erector element at the next upstream station to sensitized position.

6. In an accumulator conveyor having a continuously powered propelling member and means to support said propelling member, said means comprising: a base frame; a plurality of stations at spaced intervals along said base; a toggle at each station; a plurality of rail sections on which said propelling member rests; each of said rail sections being pivotally connected at each end to one end of one of said toggles with adjacent rail sections having a common connection to a single toggle; an arming hook at each station; the other end of each of said toggles and the lower end of each of said arming hooks having a common pivotal connection to said base; a sentry arm at each station; a hinge pin forming the central hinge of each of said toggles and pivotally mounting the sentry arm associated therewith intermediate its upper and lower ends, said hinge pin projecting into the path of pivotal movement of said arming hook; a first connecting link having an elongated opening adjacent one end and an arming pin between said opening and said adjacent end, said hinge pin passing through said opening the other end of said first connecting link being pivotally secured to the lower end of the sentry arm at the next adjacent station downstream of said conveyor; a second connecting link identical to said first connecting link and joining said sentry arm with the hinge pin and sentry arm of the next adjacent station upstream of said conveyor; said sentry arm when erected being in the path of movement of articles moving along said conveyor and swingable to depressed position by said articles; said sentry arm when moved to depressed position breaking and lowering the toggle at said upstream station, the shifting of the hinge pin of said toggle incident to its breaking, pivoting the arming hook of said upstream station to retracted position and erecting the sentry arm associated with said toggle; the erection of the toggle at the intermediate station shifting said second connecting link downstream and causing said arming pin to pivot said arming hook at said upstream station to be in erected armed position; pin elements on said propelling member positioned to engage said erected arming hook and pivot it downstream to retracted position, said arming hook as it swings engaging said hinge pin, erecting its associated toggle and pivoting the arming hooks of the next adjacent upstream station to erected armed position.

7. An accumulator conveyor characterized by an article supporting track and a powered, continuously operating propelling member having article engaging dogs and engagement elements at spaced intervals; a sectionalized propelling member support and a plurality of support means of variable height supporting each individual section thereof, said support means in raised position holding the dogs of said propelling member in article engaging position and in lowered position holding said propelling member and dogs in position to pass beneath the articles without engagement; each of said support means constituting a station; an erector element at each of said stations shiftable between sensitized and inactive positions; said erector elements mounted for engagement with said engagement elements in sensitized position; each of said erector elements engaging its associated support means and shifting it from lowered to raised position when the erector elements shift from sensitized to inactive position; an initiator means at the discharge end of said conveyor connected to the erector element at the first station adjacent thereto; an article sensing initiator arm connected to the end of said initiator means remote from said erector element for shifting said initiator means when said initiator arm senses an article, a plurality of connecting elements each operatively connecting the support means of a downstream station to the erector element of the next adjacent upstream station; said initiator means upon being released by a first article shifting said erector element at said first station to sensitized position; the next following engagement element to pass through said station engaging said erector element, shifting it to inactive position, said erector element simultaneously shifting its associated support means to raised position; the raising of said support means at said first station shifting the erector element at the next upstream station to sensitized position; said shifting of said erector element at the downstream station to inactive position and raising of the associated support means and sensitizing of the erector element at the next upstream station being repeated each station progressively upstream of the conveyor as more articles reinitiate movement thereon.

8. In an accumulator conveyor having a continuously powered propelling member and means to support said propelling member, said means comprising: a base frame; a sectionalized supporting rail beneath said propelling member; a plurality of vertically adjustable supports for said supporting rail, each having a toggle pivotally connected at one end to a section of said rail and at the other end to said base; an arming hook having its lower end pivotally connected to said base about an axis common to the pivotal connection of said toggle to said base; a sentry arm; a hinge pin forming the central hinge of each of said toggles and pivotally mounting said sentry arm intermediate its upper and lower ends, said hinge pin projecting into the path of pivotal movement of said arming hook; means when actuated in one direction for shifting said toggle into broken lowered position and simultaneously moving said hinge pin into engagement with said arming hook and thus said arming hook into a lowered retracted position; said means when shifted in an opposite direction pivoting said arming hook into an erected cocked position; pin elements on said propelling member positioned to engage said erected arming hook and pivot it to a lowered fired position, said arming hook as it swings engaging said hinge pin, erecting said toggle and raising said supporting rail; a link connecting said lower end of said sentry arm to the toggle of the next adjacent support upstream of said conveyor.

(References on following page)

References Cited by the Examiner
UNITED STATES PATENTS 2,787,364   4/1957   Beck _____ 198—34

References Cited by the Applicant
UNITED STATES PATENTS 2,815,847   12/1957   Kinnicut.
3,062,359   11/1962   McGow.

FOREIGN PATENTS 651,265   9/1951   Great Britain.
76,693   11/1954   Netherlands.

EVON C. BLUNK, *Primary Examiner.*

RICHARD E. AEGERTER, *Examiner.*